United States Patent [19]
Goring et al.

[11] 3,883,341
[45] May 13, 1975

[54] BIS-ALKYLENE PYROPHOSPHATE-UREA REACTION PRODUCTS AS SLOW-RELEASE FERTILIZERS

[75] Inventors: Cleve A. I. Goring; Henry H. Scott, both of Walnut Creek, Calif.

[73] Assignee: The Dow Chemical Company, Midland, Mich.

[22] Filed: Jan. 2, 1973

[21] Appl. No.: 320,676

Related U.S. Application Data

[62] Division of Ser. No. 133,375, April 12, 1971, abandoned.

[52] U.S. Cl. ................................ 71/29; 71/64 SC
[51] Int. Cl. ............................................ C05b 15/00
[58] Field of Search .......... 260/920, 933, 938, 968; 71/29, 64 SC

[56] References Cited
UNITED STATES PATENTS

| | | | |
|---|---|---|---|
| 2,213,513 | 9/1940 | Barcroft | 71/27 |
| 2,864,685 | 12/1958 | Waters | 71/29 |
| 3,022,153 | 2/1962 | Miller | 71/29 |
| 3,087,806 | 4/1963 | Martin | 71/29 |
| 3,382,057 | 5/1968 | Getsinger | 71/34 |
| 3,397,035 | 8/1968 | Yu Shen | 71/34 X |
| 3,495,937 | 2/1970 | Yu Shen | 71/34 X |
| 3,507,936 | 4/1970 | Olson et al. | 260/920 |
| 3,540,874 | 11/1970 | Stinson | 71/29 |
| 3,585,019 | 6/1971 | Hays | 71/28 |
| 3,586,495 | 6/1971 | Bauwens | 71/29 |

*Primary Examiner*—Charles N. Hart
*Attorney, Agent, or Firm*—S. Preston Jones

[57] ABSTRACT

Bis-alkylene pyrophosphate-urea reaction products are employed as the active ingredient in slow-release nitrogenous-phosphorus fertilizers to provide a continuous supply of nutrients for improving the growth of plants.

1 Claim, No Drawings

BIS-ALKYLENE PYROPHOSPHATE-UREA REACTION PRODUCTS AS SLOW-RELEASE FERTILIZERS

CROSS-REFERENCE TO RELATED APPLICATIONS

This is a division of application Ser. No. 133,375 filed Apr. 12, 1971, and now abandoned.

BACKGROUND OF THE INVENTION

With the advent of modern agricultural methods and the increased use of chemical fertilizers, it has become apparent that the development of means to allow the regulated dispersal of plant nutrients is of great importance. Areas of particular interest for such products are in gardening, planting of forest seedlings, nurseries and in turf management. Additionally, a chemical fertilizer which could be applied in a single application and have a regulated dispersal would require less labor and would last for long periods of time which would be of excellent utility and great value.

Various means have been proposed to effect the slow-release of plant nutrients such as, for example, alteration of the physical and/or chemical structure of the nutrients themselves. Examples of this approach include the use of urea-formaldehyde condensation products and various chelated materials as fertilizers.

Other methods for prolonging the release of fertilizers provide for coating of the fertilizer pellet. Such methods are taught in U.S. Pat. Nos. 3,150,955; 3,192,031; 3,259,482; 3,502,458; 2,806,773; 2,019,824 and others. Some have resorted to encasing fertilizers in cartridges or shells such as those taught in U.S. Pat. Nos. 3,060,012; 2,931,140; 2,032,608 and 3,057,713.

However, numerous disadvantages have been encountered in the use of most of these approaches. Such disadvantages include the high cost of the materials, the inability to provide complete coatings and the incomplete or poorly timed release of the nutrient materials.

SUMMARY OF THE INVENTION

The present invention is directed to a slow-release nitrogenous-phosphorus fertilizer composition having as the active component the condensation product obtained by condensing urea with a bis-alkylene pyrophosphate and to a method of use therefor.

The urea-bis-alkylene pyrophosphate condensation products employed in the practice of the present invention are known products and are the subject of U.S. Pat. No. 3,507,936; the disclosure of said patent which includes the method of preparation of the condensation products is incorporated herein by reference thereto.

The products which are employed as the active component in the present invention are prepared by condensing from about 1 to about 5 molecular equivalents of urea with a bis-alkylene pyrophosphate at an elevated temperature. The preferred condensation product contains about 3 molecular equivalents of urea to 1 of bis-alkylene pyrophosphate.

The pyrophosphate has the formula

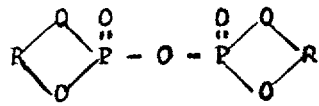

wherein R represents an alkylene or substituted alkylene radical of 2-8 carbon atoms in which the carbon atoms of attachment to the phosphate group are either vicinal or are separated by a single carbon atom. The alkylene groups may bear inert substituents, such as cycloalkyl or phenyl. Such compounds are known and can be made, for instance, by the method set forth in U.S. Pat. No. 3,159,591.

The preferred pyrophosphates are of vicinal alkylene phosphates wherein each alkylene group contains 2-4 carbon atoms, these being the most reactive and producing the condensation products having the highest content of phosphorus and nitrogen. Representative preferred alkylene and substituted alkylene radicals include, for example, ethylene, 1,2- or 1,3-propylene, 1,2-, 2,3- or 1,3- butylene, 1,2-, 2,3-, 1,3-, 2,4- or 3,4-octylene, phenylethylene, 1-phenyl-2,3-butylene and cyclohexylene.

DESCRIPTION OF SOME PREFERRED EMBODIMENTS

In order that the present invention may be more fully understood, the following examples are given primarily by way of illustration and should not be construed as limitations upon the overall scope of the present invention.

EXAMPLE I

Two hundred grams (0.87 mole) of bis-ethylene pyrophosphate, prepared by the method of U.S. Pat. No. 3,159,591, and 146 grams (2.43 moles) of urea were mixed and heated in an open vessel. Gas evolution began at about 100°C. A rapid increase in viscosity began at about 160°C. At about 170°C. a vigorous exothermic reaction began, with evolution of large volumes of gas. The peak exotherm temperature was not observed but was above 240°C. The resulting condensation product, after being cooled, was a porous brittle solid material, slowly soluble in water, this solution showing a pH of 3–4.

Elemental analysis of the product was: carbon 19.9 percent; hydrogen, 5.0 percent, phosphorus, 18.4 percent and nitrogen, 17.6 percent.

It has been found that the urea-bis-alkylene pyrophosphate condensation products employed in the present invention, are hydrolyzed in soil and ultimately yield their entire nitrogen and phosphorus content to the soil for use by growing plants.

Many crops, especially those with high nitrogen requirements, necessitate several applications of conventional nitrogen containing fertilizers over the course of the growing season. It has now been found that fertilizers containing the urea-bis-alkylene pyrophosphate condensation products of the present invention can be applied to the soil in a single application to supply a constant and uniform rate of nitrogen and phosphorus release to the soil over a prolonged period of time without "burning" or other damage to the plants. These products thus serve as a continuing source of nigrogenous and phosphorus plant food over this period of time. The use of this fertilizer permits a considerable savings in labor, equipment and storage facilities.

The condensation products can be employed as a fertilizer by themselves or as admixtures of more than one condensation product or in combination with rapidly-available nitrogenous fertilizers such as, for example, urea, ammonium sulfate, potassium nitrate, ammonium nitrate, and the like. The normal ratios of nitrogen-phosphorus and potassium are achieved by such mixture and the added readily available nutrients is advantageous in giving quick growth response. A typical fertilizer composition will contain from about 5 to about 40 percent by weight of nitrogen values, about 5 to about 50 percent by weight of phosphorus values and from about 5 to about 50 percent by weight of potassium values.

Also, the present slow-release fertilizer components can be used in combination with other ingredients used in turf and crop care. These include, for example, insecticides, weed-killers, fungicides and other like components commonly used in combination fertilizer and pest control compositions. In general, the urea-bis-alkylene pyrophosphate condensation product will comprise from about 25 to 100 percent, by weight, of the total weight of the fertilizer composition.

EXAMPLE II

A study was conducted to determine the effectiveness of the urea-bis-alkylene pyrophosphate condensation product as a slow-release nitrogen fertilizer. In this study, urea-bis-ethylene pyrophosphate condensation product, prepared in Example I, was compared in its ammonium nitrogen release properties over a prolonged period of time against Uramite, a commercially available urea-formaldehyde fertilizer product of Allied Chemical Company, in both a substantially neutral soil and an acidic soil. The composition of the soils was as follows:

ters of water. The jars were sealed and held at 70°F. for a period of up to 34 weeks. The air in each jar was changed each week beginning at the end of the first week. Each soil treatment was analyzed for the presence of ammonium and nitrate-nitrite nitrogen after incubation periods of 2, 5, 9, 26 and 34 weeks. The ammonium nitrogen was recovered from the soil by extracting the soil with 500 milliliters of water followed by distilling the ammonia from the water, collecting it in boric acid and titrating with hydrochloric acid in a conventional manner. The nitrate-nitrite nitrogen was recovered by treating the soil remaining from the above distillation step with 4 grams of Devarda's alloy (copper 50 percent; aluminum 45 percent; and zinc 5 percent), which converts the nitrate-nitrite nitrogen to ammonium nitrogen, and 70 milliliters of a 30 percent sodium hydroxide solution. The mixture is distilled and the ammonia which comes off is collected in boric acid and titrated with hydrochloric acid as above. The percent nitrogen recovered from the soil is calculated as follows:

$$\text{percent nitrogen recovered} = \frac{\text{nitrogen recovered from the treated soil}}{\text{nitrogen added to the soil}} \times 100.$$

It was established that the unhydrolyzed polymer did not interfere with this above analytical procedure.

Table II shows the results of this study expressed as percent of ammonium and nitrate-nitrite nitrogen recovered from the soil.

TABLE II

| Treated Soil | Uramite Neutral Soil | | | EPU Neutral Soil | | | Uramite Acidic Soil | | | EPU Acidic Soil | | |
|---|---|---|---|---|---|---|---|---|---|---|---|---|
| Analysis | $NH_4^+$ | $NO_3^- + NO_2^-$ | Total | $NH_4^+$ | $NO_3^- + NO_2^-$ | Total | $NH_4^+$ | $NO_3^- + NO_2^-$ | Total | $NH_4^+$ | $NO_3^- + NO_2^-$ | Total |
| 2 weeks | 0 | 46 | 46 | 21 | 20 | 41 | 26 | 8 | 34 | 45 | 0 | 45 |
| 5 weeks | 0 | 63 | 63 | 19 | 23 | 42 | 7 | 47 | 54 | 57 | 0 | 57 |
| 9 weeks | 0 | 62 | 62 | 9 | 29 | 38 | 3 | 65 | 68 | 31 | 0 | 31 |
| 26 weeks | 0 | 77 | 77 | 0 | 68 | 68 | 0 | 84 | 84 | 45 | 43 | 88 |
| 34 weeks | 0 | 78 | 78 | 0 | 75 | 75 | 0 | 99 | 99 | 30 | 69 | 99 |

EPU = bis-ethylene pyrophosphate-urea condensation product
$NH_4$ = ammonium nitrogen
$NO_3+NO_2$ = nitrate-nitrite nitrogen Table I

| Soil | pH | Organic[a] Matter | Mechanical Analyses[b] | | |
|---|---|---|---|---|---|
| | | | Sand | Silt | Clay |
| Acid Soil | 5.7 | 1.5 | 59 | 35 | 6 |
| Neutral Soil | 7.5 | 0.3 | 73 | 24 | 3 |

[a] determined by wet-ash method — given in percent of total soil weight.
[b] determined by hydrometer method — given in percent of total soil weight To each of separate neutral and acidic soils as set forth hereinabove was added one of Uramite or bis-ethylene pyrophosphate-urea condensation product as the sole fertilizer, i.e. nitrogen source, in an amount calculated to add to the soil 200 parts of nitrogen per million parts of soil. The soil fertilizer mixtures were thoroughly blended on a roller mill. Fifty-gram aliquots of each composition were placed in 4-ounce jars; the neutral soil samples were moisturized with 10 milliliters of water and the acidic soils moisturized with 15 millili-

EXAMPLE IV

In an additional operation, 3 week old plots of rye grass were treated with an aqueous suspension of bis-ethylene pyrophosphate-urea condensation product applied as a spray at a rate equal to 8 pounds of nitrogen per 1000 square feet. The plots were maintained under conditions conducive to good plant growth for three weeks. At the end of this period, the plants were found to be in good growth and in good color indicative of nitrogen release from the fertilizer and uptake by the rye grass. No phytotoxic symptoms were observed.

EXAMPLE V

In an additional operation, separate pots of a soil having a sand, silt and clay content of 80, 14 and 6 percent, respectively, a pH of 7.3 and an organic matter content of 0.4 percent, were planted with corn at 4 seeds to a pot. One pot was fertilized with a mixture of bis-ethylene pyrophosphate-urea condensation product, prepared as in Example I, and a potassium source and applied to the soil as an "in-row" application, in a narrow band at a 4-inch depth, at a rate equal to 200 pounds of nitrogen, 192 pounds of phosphorus and 200 pounds of potassium per acre, based on a 36-inch row space. The second pot was maintained as an unfertilized check. The pots were carefully watered and maintained under conditions conducive for good plant growth for a period of 9 weeks. At the end of the 9-week growing period, the corn plants were cut off at the ground level, measured, weighed, dried and reweighed. The average growth values are shown below in Table III.

Table III

|  | Treatment with EPU | Unfertilized Check |
|---|---|---|
| Color of Plant | Green | Yellow/Green |
| [1]Average Height | 34.8 inches | 31.9 inches |
| [1]Average Green Weight | 68.6 grams | 46.2 grams |
| [1]Average Dry Weight | 15.0 grams | 11.6 grams |

[1]Average of 12 plants, 3 replicates of 4 plants per pot.

Urea(18 grams, 0.3 mole) was mixed with bis-ethylene pyrophosphate (23 grams, 0.1 mole). The mixture was heated in an open vessel to 170°C., at which point a vigorous exothermic reaction with evolution of gas occured; the mixture became very viscous and subsequently solidified on cooling. Analysis showed carbon, 20.2 percent; hydrogen 4.4 percent; phosphorus, 17.1 percent and nitrogen, 19.6 percent. The hard, glossy solid was slowly soluble in water, in which is showed an apparent molecular weight of 189.

Other urea-bis-alkylene pyrophosphate condensation products are prepared wherein the molar ratio of the urea to bis-alkylene pyrophosphate varies over the range of from 1:1 to 5:1 urea:bis-alkylene pyrophosphate. The resulting condensation products, while not quite as homogeneous as the preferred product, do, when used as slow release fertilizers, give results similar to that of the preferred 3:1 condensation product. Similarly, products wherein the alkylene group is 1,2- or 1,3-propylene, 1,2-, 2,3- or 1,3- butylene, 1,2-, 2,3-, 1,3-, 2,4- or 3,4- octylene, phenylethylene, 1,-phenyl-2,3-butylene and cyclohexylene are also found to give similar results.

What is claimed is:

1. A method of fertilizing the soil which comprises applying to the soil a bis-ethylene pyrophosphate-urea condensation product prepared by the condensation of about 3 molecular equivalents of urea with about 1 molecular equivalent of bis-ethylene pyrophosphate.

* * * * *